W. T. CASSIDY.
INDICATING BOTTLE.
APPLICATION FILED OCT. 12, 1908.
962,004.
Patented June 21, 1910.
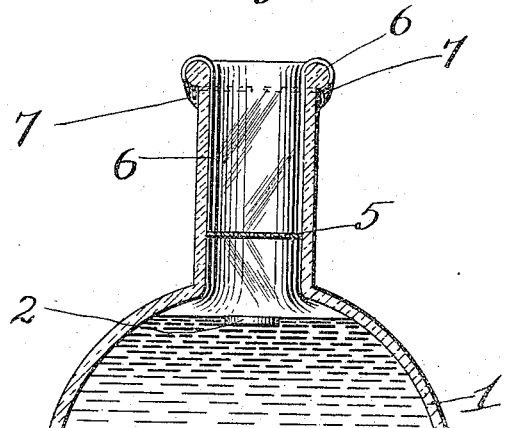
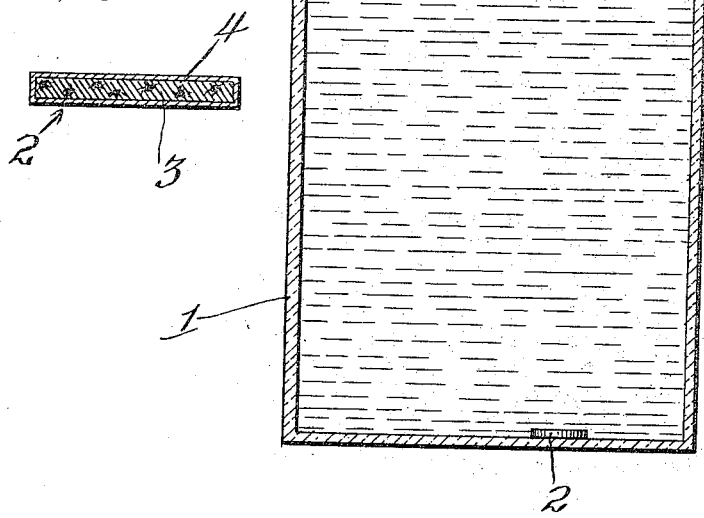
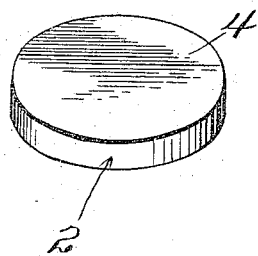
Witnesses
Arthur E. Neily
F. A. Barron
Inventor
William T. Cassidy
By Milo B. Stevens & Co.
Attorneys

UNITED STATES PATENT OFFICE.

WILLIAM THOMAS CASSIDY, OF CHICAGO, ILLINOIS, ASSIGNOR OF ONE-HALF TO EDWARD C. BEIRIGER, OF CHICAGO, ILLINOIS.

INDICATING-BOTTLE.

962,004.  Specification of Letters Patent. Patented June 21, 1910.

Application filed October 12, 1908. Serial No. 457,443.

*To all whom it may concern:*

Be it known that I, WILLIAM THOMAS CASSIDY, a citizen of the United States, and a resident of the city of Chicago, in the county of Cook and State of Illinois, have invented a new and useful Improvement in Indicating-Bottles, of which the following is a full, clear, and exact description.

My invention relates to bottles, and more particularly to an indicating bottle.

The principal object of my invention comprehends the production of a device of the above character having means adapted to float at different points in the liquid contained in the bottle and which will positively indicate, by a change of position, any fraudulent adulteration or change of said liquid.

A further object of my invention resides in a device of the kind having means to prevent the indicators from being withdrawn or tampered with by unauthorized persons.

In the drawings which form a part of this specification and in which like reference numerals indicate corresponding parts throughout the several views—Figure 1 is a vertical sectional view of a bottle showing the application of my invention; Fig. 2 is an enlarged sectional view of one of the indicators; and Fig. 3 is an enlarged perspective view thereof.

Referring specifically to the drawings, 1 indicates a bottle, which may be of any conventional form, inasmuch as it forms no part of my invention.

The indicators 2 are adapted to be inserted through the neck of the bottle either before or after the genuine liquid, or in other words, the liquid they are adapted to protect, has been placed into the bottle. As best seen in Fig. 3, these indicators may be of disk shape, and each comprise a body portion 3 of cork, or any other similar material, covered by a thin coating of wax 4. The indicators are of different weight or specific gravity and are each properly weighted and tested before they are placed into the bottle, so that the specific gravity of each will correspond to that of the liquid they are adapted to protect. The lighter one of the indicators will, if the liquid is genuine, occupy a position at the level of said liquid, while the heavier one will occupy a position at the bottom of the bottle. It will thus be seen that with the genuine liquid in the bottle and the indicators properly weighted, said indicators will remain at the position above described, but as soon as the liquid is adulterated or changed, the indicators will, owing to either the increased or decreased specific gravity of the liquid, change their relative positions thereby giving an understood indication that the liquid is not genuine. If the adulteration or change adds to the weight or specific gravity of the liquid the heavier float will immediately rise to the level of the liquid, and join the lighter indicator. And, on the other hand, if the adulteration lessens the specific gravity of the liquid then the lighter indicator will fall through the liquid and join the heavier indicator at the bottom of the bottle, in either event indicating to the consumer that the contents of the bottle has been changed or adulterated.

Located at a suitable point within the neck of the bottle is a perforated guard plate 5 which is held in place by wire supports 6 connected at their lower ends to the opposite edges of said perforated guard plate 5, and extending upwardly and hooked over and around the mouth of the bottle. The ends of said supports 6 are sealed to the sides of the bottle, as indicated at 7, thereby preventing the removal of the guard plate without breaking the seal.

While the drawing illustrates my invention as applied to a bottle, it may also be used in connection with any liquid containing receptacle so long as the indicators may be observed, and no limitation is implied by reason of the particular structure shown.

From the foregoing it will be seen that I provide a practical and simple device whereby the genuine liquid is protected from adulteration and the illegitimate refilling of the bottle with a different liquid having a different specific gravity is prevented. Inasmuch as it has been before stated that the specific gravity of the lighter indicator is less than that of the liquid, and that the specific gravity of the heavier indicator is greater than that of the liquid, it follows, and should be understood, that certain changes in the specific gravity of the liquid, due to changes in temperature, and to other causes, may take place, without affecting the operation of the indicators as stated.

I claim:

1. In combination with a vessel, containing a liquid having a certain specific gravity, a pair of indicators in said liquid, one of said indicators having a specific gravity slightly less than that of the liquid and the other having a specific gravity slightly greater than that of the liquid, whereby the lighter indicator will occupy a position at the level of said liquid while the heavier indicator will occupy a position at the bottom of said vessel.

2. In combination with a vessel containing a liquid having a certain specific gravity, a pair of indicators in said liquid, each having a different specific gravity so as to cause said indicators to occupy different positions in said liquid, the specific gravity of each being in relation to that of the liquid they are adapted to protect, whereby adulteration or a complete change of the liquid will cause said indicators to change their relative positions, and a guard plate carried by the vessel to prevent the removal of said indicators.

3. In a device of the kind described comprising a liquid containing vessel, a pair of indicators located in said liquid at different points, the specific gravity of said indicators being such as to allow for slight changes in the specific gravity of the liquid, caused by the same being exposed to different temperatures, without changing their relative positions, and a perforated guard plate to prevent the removal of said indicators.

WILLIAM THOMAS CASSIDY.

Witnesses:
WALTER B. H. ROWE,
MARTHA CASSIDY.